United States Patent [19]

Farrell et al.

[11] Patent Number: 4,481,971
[45] Date of Patent: Nov. 13, 1984

[54] REGULATOR AND SHUT-OFF VALVE ASSEMBLY

[75] Inventors: Gerald J. Farrell, Elmhurst; Edward Mayer, North Riverside, both of Ill.

[73] Assignee: Elkay Manufacturing Company, Broadview, Ill.

[21] Appl. No.: 461,692

[22] Filed: Jan. 28, 1983

[51] Int. Cl.³ .............................................. F16K 43/00
[52] U.S. Cl. ................................. 137/315; 137/454.6; 137/495
[58] Field of Search ...................... 137/315, 454.6, 495; 251/356, 357, 360, 367, 368

[56] References Cited

U.S. PATENT DOCUMENTS

| | | | |
|---|---|---|---|
| 1,793,292 | 2/1931 | Taylor | 137/495 |
| 2,868,223 | 1/1959 | Lum | 137/454.6 |
| 3,003,519 | 10/1961 | Homeyer et al. | 137/454.6 |
| 3,089,510 | 5/1963 | Lum | 137/454.6 |
| 3,139,898 | 7/1964 | Wiltgen et al. | 137/454.6 |
| 3,448,768 | 6/1969 | Keller | 137/606 |
| 3,493,010 | 2/1970 | Dreibelbis | 137/454.6 |
| 3,538,942 | 11/1970 | Lyall et al. | 137/454.6 |
| 3,902,600 | 9/1975 | Turner et al. | 137/454.6 |

*Primary Examiner*—George L. Walton
*Attorney, Agent, or Firm*—Leydig, Voit, Osann, Mayer & Holt, Ltd.

[57] ABSTRACT

A cartridge type regulator and shut-off valve assembly for a water cooler includes a hollow cylindrical body received in a mating bore in a casting which is part of the cooler. The cartridge includes a hollow cylindrical body which, at its inner end, is formed with an inlet passage and an outlet passage connected to each other by a valve-controlled opening in the inlet passage. This opening faces axially inwardly of the body while the valve faces outwardly and is carried by an axially movable stem. A manual actuator is depressed to slide the valve stem inwardly and move the valve away from the opening and the valve is returned by a spring to the closing position when the actuator is released. The valve-controlled opening, as well as a part of the inlet passage, is formed in a bar which extends diametrically across the inside of the body and is an integral part of the latter so that the opening does not shift or creep even if the parts are made of molded plastic. Assembly of the valve stem is facilitated by forming it in parts with the inner part being U-shaped. The valve is carried on the crosspiece of the U and the legs of the U straddle the bar and are formed with hooks which snap into engagement with hooks on another part of the stem so that the parts form a unitary stem.

5 Claims, 4 Drawing Figures

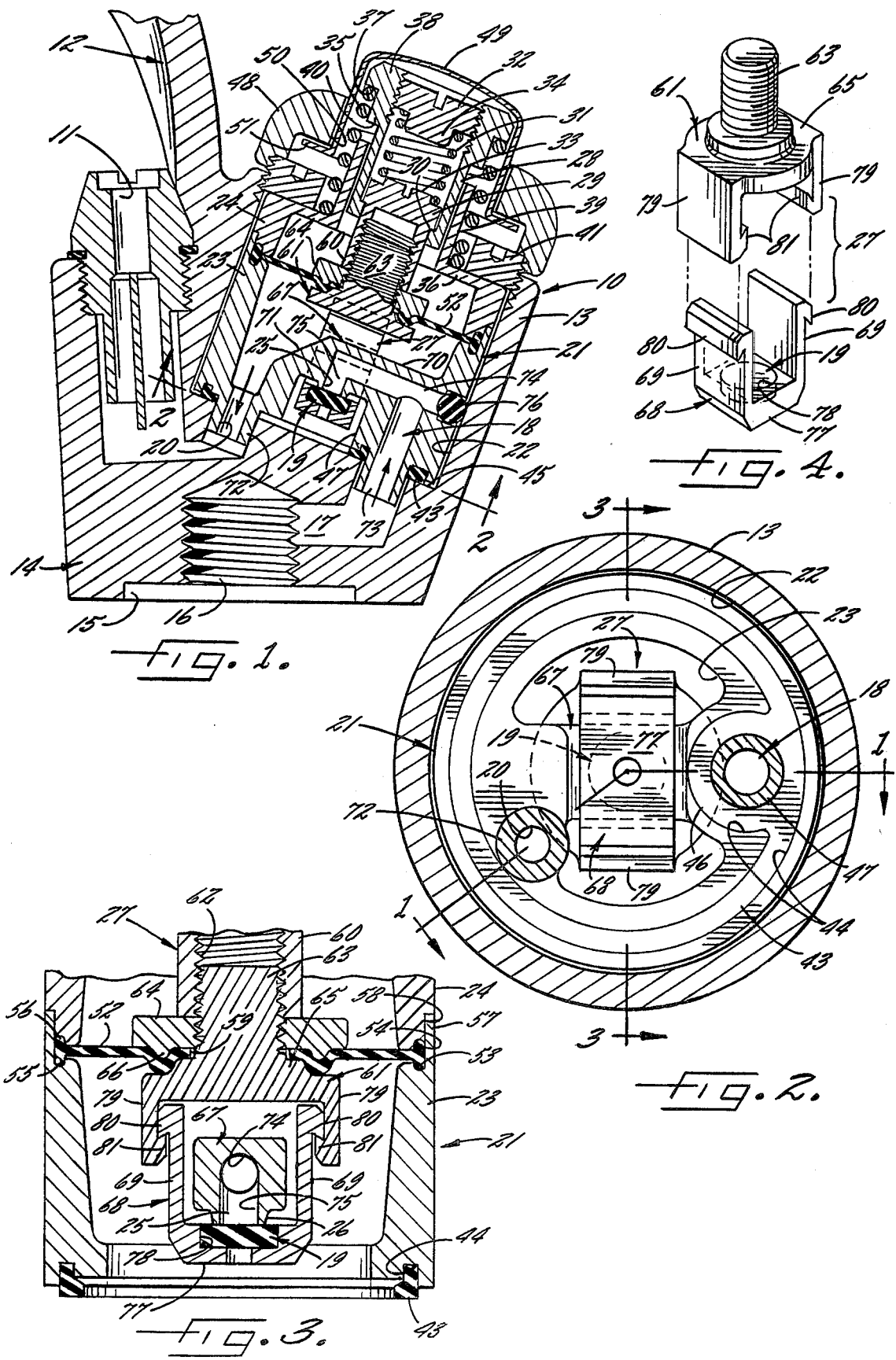

REGULATOR AND SHUT-OFF VALVE ASSEMBLY

BACKGROUND OF THE INVENTION

This invention relates to a regulator and shut-off valve assembly of the cartridge type as conventionally used in water coolers to control the flow of water from a source to the outlet or spigot. The valve assembly includes a hollow cylindrical body which is received in a complemental bore formed in a casting which is a part of the cooler. When in place, the valve assembly connects a source of water under pressure to the outlet or spigot of the water cooler through inlet and outlet passages and a valve-controlled opening in the inlet passage. The opening usually is coaxial with the body of the assembly and faces inwardly while a valve opposes the opening and is movable toward and away from the latter. The valve is carried by a stem which extends along the axis of the body and is movable longitudinally to move the valve. The valve stem is depressed manually to move the valve away from the opening and is returned to its original position by a spring. Customarily, the principal parts of the valve assembly are molded from a semi-rigid plastic material and typical assembly of this type is shown in Turner et al U.S. Pat. No. 3,902,600. In prior assemblies of this type, there has been a tendency of the valved opening to shift or creep relative to the valve, especially when the parts are made of plastic, and such creeping can interfere with the proper cooperation of the valve and the opening.

SUMMARY OF THE INVENTION

The general object of the invention is to construct and arrange a valve assembly of the foregoing type in a novel manner so that the valve-controlled opening in the inlet passage remains in a fixed position relative to the other parts and does not creep even though the principal parts of the assembly are made of plastic.

A further object is to construct the valve stem in a new and improved manner so that the stem and the valve may be installed easily even though the valved opening is made rigid with the body of the assembly.

A more detailed object is to form the valved opening in a bar which extends generally diametrically across the inside of the body and is molded integrally with the body so that the position of the bar and hence of the opening remains fixed relative to the body.

Still another object is to make the valve stem in parts with the innermost part carrying the valve and being formed with spaced legs which straddle the bar and are snapped into connecting engagement with the remainder of the stem.

The invention also resides in the details of the bar and of the valve stem.

BRIEF DESCRIPTION OF THE DRAWINGS

FIG. 1 is a longitudinal sectional view of a valve assembly embodying the present invention, the view being taken along the line 1—1 in FIG. 2 and including in section a portion of a water cooler.

FIG. 2 is an enlarged sectional view taken along the line 2—2 in FIG. 1.

FIG. 3 is a sectional view taken along the line 3—3 in FIG. 2.

FIG. 4 is an exploded perspective view of a portion of the valve stem.

DETAILED DESCRIPTION OF THE PREFERRED EMBODIMENT

As shown in the drawings for purposes of illustration, the invention is embodied in a regulator and shut-off valve assembly 10 for controlling the flow of a fluid such as water under pressure from a source (not shown) to an outlet 11 which, in the illustrated form, is the spigot of a water cooler 12 used for drinking purposes. The valve assembly is of the cartridge type and is received in an upwardly opening cylindrical portion 13 of a casting 14 which is a rigid part of the cooler. An inlet 15 in the casting is threaded as indicated at 16 so that the casting may be attached to the water source and, from the inlet, the water flows through a bore 17 in the casting to an inlet passage 18 at the inner end of the valve assembly. As controlled by a manually actuated valve 19, the water flows from the inlet passage to the interior of the assembly and out through an outlet passage 20 which also is at the inner end of the assembly. The outlet passage communicates with the spigot 11 of the cooler.

In the present instance, the body 21 of the valve assembly 10 is cylindrical and is received in the bore 22 of the cylindrical portion 13 of the casting 14 with its axis inclined away from the vertical, the bore being open at its upper end. The body of the assembly includes a cylindrical inner housing 23 interfitting with a coaxial outer housing 24 and, preferably, both housings are molded from a suitable semi-rigid plastic material. The inlet passage 18 is formed as an integral part of the inner housing and this passage terminates in an opening 25 which faces inwardly and which is coaxial with the body. Surrounding the opening 25 is a valve seat 26 which is opposed by the circular valve 19. The latter is carried by an elongated valve stem 27 which extends along the axis of the body 21 and is mounted to move longitudinally inwardly and outwardly to act with the valve seat in opening and closing the opening 25 of the inlet passage 18. Further, the valve stem is arranged to be moved manually to control the flow of water to the spigot 11.

To support the valve stem 27 for axial movement, the outer end portion of the stem projects into an actuator sleeve 28 and a peripheral flange 29 on this end portion of the stem opposes an outwardly facing shoulder 30 formed on the inner end of the sleeve. The flange is freely slidable in the sleeve and is resiliently held down against the shoulder by a coiled compression spring 31 which is coaxial with the body 21 and which acts between the upper end of the stem and a plug or screw 32 threaded into the outer end of the sleeve 28. Cylindrical bosses 33 and 34 integral with the end of the stem and inner side of the plug respectively center the spring. With this arrangement, the valve 19 is moved away from the seat 26 by manually depressing the sleeve 28 which, through the plug 32 and the spring 31, moves the valve stem 27 downwardly. The response of the valve to movement of the sleeve may be regulated by threading the plug in or out to vary the compression of the spring 31.

To return the valve 19 against the seat 26 after the sleeve 28 has been released, a second coiled compression spring 35 acts between an outer end wall 36 on the outer housing 24 and an inwardly facing shoulder 37 formed on a peripheral flange 38 at the outer end of the sleeve. The latter slides in a cylindrical axial flange 39 formed as an integral part of the end wall 36 of the outer housing and this flange opposes and is normally spaced from an enlarged portion 40 formed on the sleeve inwardly of the flange 38. The enlarged portion 40 abuts the end of the flange 39 to limit inward sliding of the sleeve and these two parts also serve as guides to center the return spring 35.

The valve assembly is held in the bore 32 of the casting 14 by a ring 41 which is threaded into the bore and bears against the outer wall 36 of the housing 24. As the ring 41 is tightened down, it compresses a gasket 43 in the form of a ring seated in a groove 44 in the inner end of the inner housing 23 and bearing against the inner end wall 45 of the bore 22. As shown in FIG. 2, the gasket 43 also includes a circular portion 46 surrounding a hollow boss 47 which defines a portion of the inlet passage 18. An annular cap 48 receives a sheet metal thumb piece 49 and is threaded onto the ring 41 so that the cap and the thumb piece close the bore 22 and cover the valve assembly. The thumb piece is in the shape of an inverted cup covering the sleeve 38 and is slidable in a central opening 50 in the cap, the outward movement of the thumb piece being limited by a peripheral flange 51 which abuts the inside of the cap. Thus, the valve 19 is opened by pushing the thumb piece which, in turn, pushes the sleeve 38 and the spring 35 returns the parts to their original positions when the thumb piece is released.

In order to contain the water in the body 21 of the valve assembly 10 as the water passes from the inlet passage 18 through the valved opening 25 and out the passage 20, a circular diaphragm 52 extends across the interior of the body and is in sealing engagement with both the valve stem 27 and the wall of the body. Herein, the periphery of the diaphragm is captured between the abutting ends of the inner and outer housings 23 and 24 and, for this purpose, these ends are formed with annular grooves 53 and 54 respectively (FIG. 3). The diaphragm is made of a flexible material such as rubber and oppositely projecting flanges 55 and 56 at the periphery of the diaphragm are seated in the grooves 53 and 54. Outside the groove 55 the wall of the inner housing 23 projects outwardly, as indicated at 57, and into a recess 58 in the wall of the outer housing with a snug fit. With the spring 35 acting between the sleeve 38 and the upper housing 24, the spring tends to hold the housing parts together during normal shipping and assembly of the water cooler. The valve stem passes through a central opening 59 in the diaphragm and is formed in a plurality of parts with two parts 61 and 64 clamping the diaphragm completely around the opening 59. The flange 29 is formed on a part 60 which is a hollow cylinder opening inwardly and formed with an internal thread 62. The latter receives the threded outer portion 63 of the part 61 and the part 64 is in the form of a ring threaded internally and disposed between the inner end of the part 60 and a radial flange 65 on the part 61, the cylinder 60 and the ring 64 being threaded onto the portion 63. The portion of the diaphragm 52 around the opening 59 is disposed between the ring 64 and the flange 65 so that, when the part 61 is threaded into the part 60, the diaphragm is clamped between the ring and the flange. During such clamping, a circular rib 66 on the inner side of the ring engages and flexes the diaphragm to improve the sealing effect it will be seen that the diaphragm and the gasket 43 cooperate to insure that water does not leak from the body 21 as it flows through the valve assembly 10.

In accordance with the present invention, the valve assembly 10 is constructed and arranged in a novel manner so that the outlet 25 of the inlet passage 18 is in a fixed position relative to the other parts and not likely to creep even though the principal parts of the assembly are plastic moldings and, at the same time, assembly of the parts is not complicated. To achieve the foregoing, the outlet is formed in a bar 67 extending generally diametrically across the body 21 and, herein, across the inner housing 23 of the body with both ends of the bar being rigid with the housing. In the present instance, the bar is molded integrally with the inner housing. Further, the valve stem 27 includes a third part 68 which has spaced legs 69 that straddle the bar 67 and interlock with the part 61 so that the valve 19 and the stem 27 may be assembled easily even though the bar extends completely across the inner housing.

In the illustrated embodiment, the bar 67 has a portion 70 which extends inwardly from the left as viewed in FIG. 1 at about the longitudinal midpoint of the inner housing 23 and continues transversely beyond the axis of the housing and then is completed by a second portion 71 which is stepped inwardly. A rounded boss 72 is molded integrally with the bar portion 71 on the inner side thereof and at the wall of the inner housing. With this arrangement, the inlet passage 18 is made up of three parts, namely, a longitudinal section 73 in the boss 47, a transverse section 74 in the bar 67 and an axial section 75 also in the bar, the latter section terminating in the valve-controlled opening 25. The outlet passage 20 extends longitudinally of the body 21 and is found in the boss 72 which is at the opposite end of the bar from the boss 47. For ease of molding, the section 74 of the inlet passage extends through the wall of the inner housing 23 and is closed by a resilient ball seal 76 which is made of rubber or the like and which bears against the wall of the bore 22 in the casting 14.

In order that the valve 19 and the valve stem 27 may easily be assembled in place even though the bar 67 extends completely across the interior of the body 21, the third part 68 of the valve stem is U-shaped (see FIG. 4) with a crosspiece 77 spanning the inner ends of the legs 69, all three parts 60, 61 and 68 of the stem being molded plastic pieces. A circular recess 78 is molded in the outer side of the crosspiece and the valve 18, which herein is in the form of a rubber dish, is seated in this recess. As shown in FIGS. 3 and 4, the legs 69 of the part 68 project in between spaced legs 79 which are formed on the stem part 61 and which project inwardly. As the legs 69 are slid in between the legs 79, inwardly facing hooks 80 formed on the outsides of the legs 69 snap into engagement outwardly facing hooks 81 formed on the insides of the legs 79 and these hooks hold the parts 61 and 68 together so that all parts of the stem move axially as a unit.

It will be observed that, with the arrangement described above, the valve seat 26 remains in a fixed position relative to the body 21 without any significant tendency to creep. This is due to the fact that the valve seat is formed on the bar 67 and the latter is anchored at both ends to the body. Even though the bar extends completely across the body, the valve 19 is easily assembled simply by holding the stem part 68 in a tweezer-like tool and inserting this part through the inner end of the assembly 10 until the hooks 80 on the legs 69 snap into engagement with the hooks 81 on the legs 79.

We claim:

1. In a valve assembly of the cartridge type, said valve having, a cylindrical body of predetermined diameter, said body being rigid and having inner and outer ends, said body having an inlet passage and an outlet passage adjacent the inner end thereof, said inlet passage terminating in an opening facing axially inwardly and being coaxial with said body, a valve seat formed around said opening, a valve member facing axially outwardly to engage said seat and close said inlet passage, a valve stem rigid with said valve member and extending axially outwardly through said body, means supporting said stem for axial movement thereby to move said valve member toward and away from said valve seat, and actuator operable manually to move said stem axially inwardly thereby to move said valve member away from said seat and permit said inlet passage to communicate with said outlet passage through the interior of said body, the improvement comprising, a bar formed integrally with said body and extending generally diametrically across the interior of the latter, at least a portion of said inlet passage extending transversely of said bar, said opening of said inlet passage being formed in said bar and said valve seat being an integral part of said bar, said valve stem including an inner part and an outer part, said outer part being disposed outwardly of said bar and operatively attached to said actuator, said inner part being U-shaped with the crossbar of the U facing said valve seat and the legs of the U projecting outwardly and straddling said bar prior to the assembly of said outer part to said inner part, and coacting means formed on the end portions of said legs and on said outer part and operable with engaged to lock the inner and outer parts together thereby to complete the assembly of said inner and outer parts.

2. In a valve assembly as defined in claim 1, said body, said bar and said valve stem all being molded from a rigid but flexible plastic material, said bar being molded integrally with said body.

3. In a valve assembly as defined in claim 2 in which said coacting means includes a first pair of hooks formed on the end portions of said legs and a second pair of hooks formed on said outer part and shaped to mate with said first pair, said first pair of hooks snapping into locking engagement with said second pair of hooks as said inner part of said valve stem is assembled on said outer part.

4. In a valve assembly of the cartridge type, said valve having, a rigid annulus of predetermined diameter and constituting an inner housing, a second rigid annulus of substantially the same diameter and consitituing an outer housing disposed end to end with said first housing, said inner housing having an inlet passage and an outlet passage adjacent the inner end of the housing, said inlet passage terminating in an opening facing axially inwardly and being coaxial with said inner housing, a valve seat formed around said opening, a valve member facing axially outwardly to engage said seat and close said inlet passage, a valve stem rigid with said valve member and extending axially outwardly through said inner and outer housings, means supporting said stem for axial movement thereby to move said valve member toward and away from said valve seat, a flexible circular diaphragm having its peripheral edge portion clamped between the adjacent ends of said housing, said diaphragm encircling said valve stem in sealing engagement therewith, an actuator operable manually to move said stem axially inwardly thereby to move said valve member away from said seat and permit said inlet passage to communicate with said outlet passage through the interior of said inner housing, the improvement comprising, a bar formed integrally with said inner housing and extending generally diametrically across the interior of the latter, at least a portion of said inlet passage extending transversely of said bar, said opening of said inlet passage being formed in said bar and said valve seat being an integral part of said bar, said valve stem including an inner part and an outer part, said outer part being disposed outwardly of said bar and operatively attached to said actuator, said inner part being U-shaped with the crossbar of the U facing said valve seat and the legs of the U projecting outwardly and straddling said bar prior to the assembly of said outer part to said inner part, and coacting means formed on the end portions of said legs and on said outer part and operable when engaged to lock the inner and outer parts together thereby to complete the assembly of said inner and outer parts.

5. In a valve assembly as defined in claim 4, said inner and outer housings and said bar being molded from a semi-rigid plastic material and said bar being molded integrally with said inner housing.

* * * * *